(12) United States Patent  
Whitney

(10) Patent No.: US 7,419,514 B2  
(45) Date of Patent: Sep. 2, 2008

(54) PROCESS FOR PRODUCING A LIQUID FUEL COMPOSITION

(75) Inventor: John P. Whitney, Phoenix, AR (US)

(73) Assignee: Rineco Chemical Industries, Inc., Benton, AR (US)

( * ) Notice: Subject to any disclaimer, the term of this patent is extended or adjusted under 35 U.S.C. 154(b) by 590 days.

(21) Appl. No.: 10/918,662

(22) Filed: Aug. 13, 2004

(65) Prior Publication Data

US 2006/0032113 A1     Feb. 16, 2006

Related U.S. Application Data

(63) Continuation of application No. 10/109,418, filed on Mar. 28, 2002, now abandoned.

(60) Provisional application No. 60/340,786, filed on Oct. 30, 2001.

(51) Int. Cl.  
 *C10L 1/10* (2006.01)  
 *C10L 5/00* (2006.01)

(52) U.S. Cl. .......................................... 44/280; 44/628

(58) Field of Classification Search .................. 585/240, 585/241; 44/628, 591, 280  
See application file for complete search history.

(56) References Cited

U.S. PATENT DOCUMENTS

2003/0153797 A1* 8/2003 Percell ........................ 585/240

* cited by examiner

*Primary Examiner*—Cephia D Toomer  
(74) *Attorney, Agent, or Firm*—McGuirewoods LLP

(57) ABSTRACT

A process to produce a flowable fuel or fuel supplement from solid and/or liquid waste, such as industrial waste. A system to carry out the process includes producing from the solid and/or liquid industrial waste a solid char and vaporize liquids, recombining the char and the liquids, recovered from the wastes feed, to form a feed slurry containing solids, combining the feed slurry with additional combustible waste liquids which are added at a rate and amount to obtain a fuel slurry of specified properties, particularly specified viscosity and BTU content, subjecting the feed slurry and additional wastes to conditions of attrition in at least one attrition zone to produce a product slurry containing solids of fuel size, recovering the fuel slurry which be used as fuel in partial oxidation processes. The liquid waste may be collected as a product, particularly if they are high in organic compounds.

20 Claims, 2 Drawing Sheets

PROCESS FOR PRODUCING A LIQUID FUEL COMPOSITION

This application is a continuation of application Ser. No. 10/109,418, filed Mar. 28, 2002, now abandoned, which claims the benefit of U.S. Provisional Application No. 60/340,786, filed on Oct. 30, 2001.

FIELD OF THE INVENTION

This invention relates to the handling of waste materials and more particularly in the converting of the waste material to a usable fuel material. In particular the invention relates to the preparation of a definable liquid fuel.

BACKGROUND OF THE INVENTION

The disposal of organic solid waste has become an increasingly severe problem in view of the increasing population, the concentration of populations in urban and suburban areas and the increasing number of industries generating organic solid wastes. Some national jurisdictions are about to enter a zero landfill era, which necessitates the immediate solution to waste and in particular solid waste disposal.

A large fraction of such organic waste is combustible and is made up of such material as paper, textiles, leather, rubber, yard wastes, wood, wood wastes and bark, garbage, plastics, paints, industrial wastes and sludges and sanitary sewage treatment products. The process of this invention is directed to the conversion of the entire spectrum of wastes into products which can be used as a fuel or fuel supplement.

Inasmuch as it is becoming increasingly difficult to dispose of wastes, particularly solid waste by such previously used means as dumping and filling, a critical need has arisen to find other techniques for waste disposal, such techniques of necessity being those which do not create pollution problems and of preference those which do not require the expenditure of appreciable amounts of energy. Moreover, if the end product or products of the disposal process are themselves usable, the process is even more desirable.

In general, the processes more recently proposed for solid waste disposal may be classed as bulk reduction, conversion or reclamation. Although some advances in bulk reduction (densification) have been made, each of the techniques used (baling, incineration, etc.) have inherent drawbacks including disposal of the densified material, pollution control and the like. The techniques used include pyrolysis (destructive distillation or decomposition at elevated temperatures, e.g., 750°-1600° F., in the absence of air or other reactive or oxidizing gases), composting (aerobic conversion of cellulose waste into inert humus-like material by aerobic bacteria), hydrogenation, wet oxidation, hydrolysis, anaerobic digestion, biological fractionation and the like.

Recycling involves the separating out from the solid waste of such materials as glass, plastics, metals, papers, textiles and the like for reuse in one form or another. However, other than some forms of papers, plastics and textiles, the combustible component of organic solid wastes which has caloric value has not been recovered. Only recently has any serious attempt been made to convert the combustible materials to a form in which they could be used as a fuel.

Older processes such as those in U.S. Pat. Nos. 3,961,961 and 4,008,053 used acid treatment to embrittle organic waste material for grinding to produce solid fuels. More recently the processes are used to produce liquid flowable fuels as in U.S. Pat. Nos. 6,000,639 and 6,202,577.

It is a primary advantage of this invention that it is possible to treat all waste including municipal and industrial solid wastes and liquid wastes to form a consistent liquid flowable fuel or fuel supplement using a relatively small amount of energy and employing known system components. The resulting product material is usable as a fuel or fuel supplement in existing combustion equipment without requiring any substantial modification. This product retains essentially all of the caloric content of the original waste material from which it is formed. It is another advantage that the process described can be carried out with the expenditure of relatively little energy so that the net result of the process is an energy gain in the form of caloric fuel.

Still another advantage of this invention is that the process does not involve substantial pyrolysis, decomposition or chemical conversion and therefore does not generate pollution control problems. It is a further advantage of this invention that the process described can be carried out in available system components and which can be readily adapted to conditions prevailing within a given area to form a fuel product best suited for the area in which it is produced or to be used. It is yet another primary advantage of this invention that a unique fuel or fuel supplement is produced. It is yet another advantage that such a fuel or fuel supplement may be stored and handled without under going decomposition.

Other advantages of the invention will be apparent hereinafter.

SUMMARY OF THE INVENTION

Briefly the present invention is a process to produce flowable fuel or fuel supplement from solid municipal waste, industrial wastes or mixtures thereof and the system to carry out the process. The resulting fuel products are characterized as a combustible material with caloric value. They are further characterized as being suitable for use as a fuel or in admixture with other fuels in different forms for full and partial oxidation.

The invention accordingly comprises the several steps and system components and the relation of one or more of such steps or system components with respect to each of the others and the fuel slurry which possess the characteristics, properties and relation of elements, all as exemplified in the detailed disclosure hereinafter set forth.

The process comprises providing a feed of solid and liquid municipal waste, industrial wastes or mixtures thereof to a treatment zone under conditions of temperature to produce a solid char and vaporize liquids, recovering the vaporized liquids as product or combining said char and said recovered liquids to form a feed slurry containing solids, combining said feed slurry with additional wastes comprising combustible liquids, subjecting said feed slurry and additional wastes to conditions of attrition in at least one attrition zone to produce a product slurry containing solids of fuel size, recovering said fuel slurry as fuel product. Preferably the additional waste is added at a rate and amount to obtain a fuel slurry of specified properties, particularly specified viscosity and BTU content. The present process may also be operated to recover a portion of the vaporized liquid as a product and to recover a portion of the vaporized liquid and to recombine it with the char.

In one embodiment the process comprises providing a feed of solid and liquid municipal waste, industrial wastes or mixtures thereof to a treatment zone under conditions of temperature to produce a solid char and vaporize liquids, recovering and condensing said vaporized liquids, combining said char and said recovered liquids to form a first slurry containing solids of a first size, combining said first slurry with additional wastes comprising combustible liquids, subjecting said first slurry and additional wastes to conditions of attrition in a first attrition zone to produce a second slurry containing solids of a second size, said second size being smaller than said first size, recovering said second slurry and subjecting said second slurry to attrition in a second attrition zone under conditions of attrition to produce a third slurry containing solids of a third size, said third size being smaller than said second size, recovering said third slurry and subjecting said third slurry to attrition in a third attrition zone under attrition conditions to produce a fuel slurry containing solids of fourth size, said fourth size being smaller than said third size and recovering said fuel slurry as fuel product.

For a fuller understanding of the nature and objects of the invention, reference should be had to the following detailed description taken in connection with the following drawing which is a flow diagram of the process of this invention illustrating various embodiments and modifications.

These and other objects, features and advantages of the present invention will become more apparent upon reading the following specification in conjunction with the accompanying drawings.

DETAILED DESCRIPTION OF A PREFERRED EMBODIMENT

Figure 1:
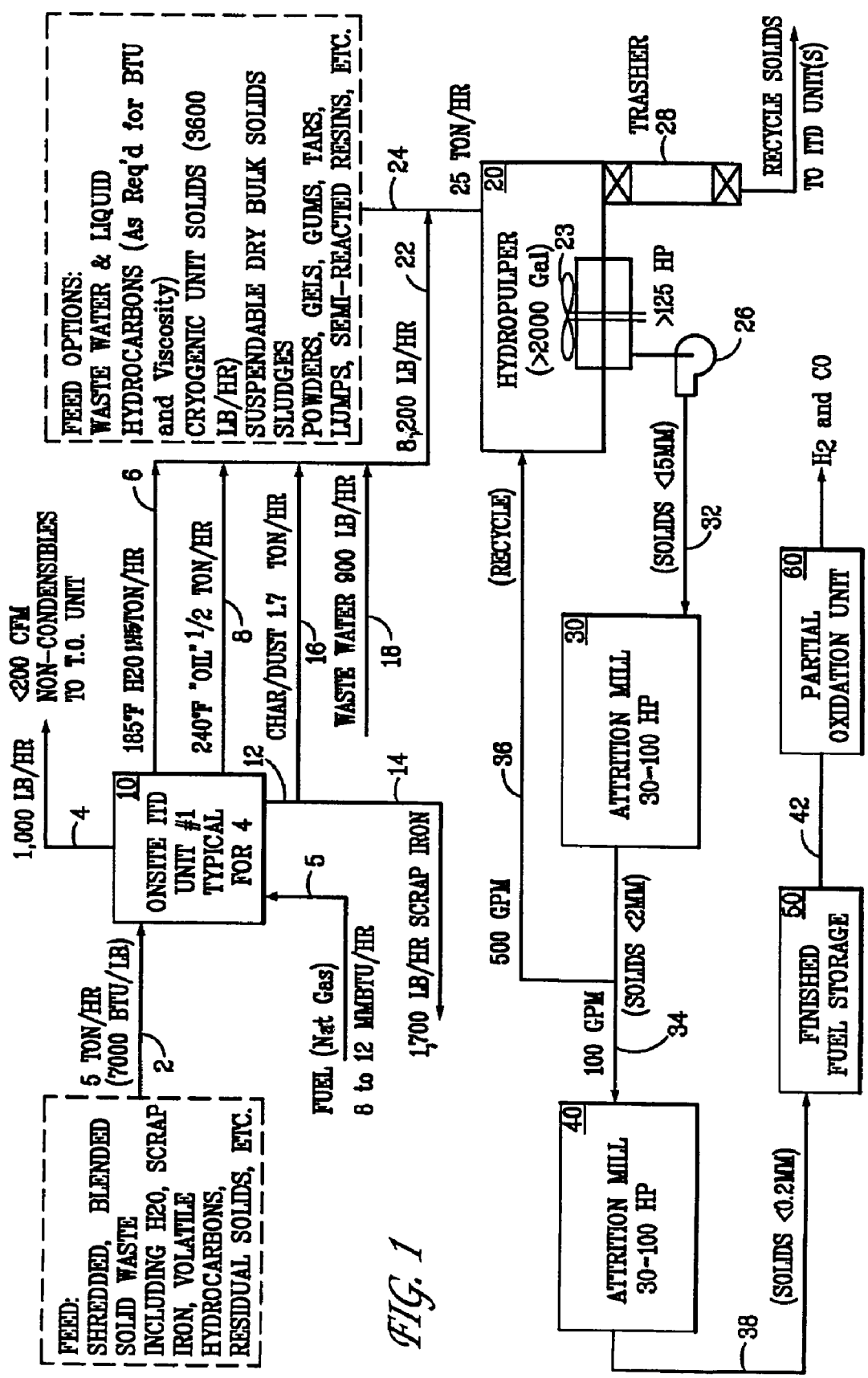
FIG. 1 is a schematic representation of one embodiment of the present invention.

One element of the present system is a rotating drum having an auger feed, an air tight seal, chain flails, and spiral and lateral flights within the drum which is heated externally, through which wastes are heated and processed to form the char and to remove and recover the condensable materials.

The material for treatment enters the unit through a hopper and is then propelled by means of an auger into the heated, rotating drum. Heat is applied to the outside of the rotating drum by means of two gas burners mounted on the bottom of the trailer. The flames, therefore, do not come in direct contact with the treated material, with the heat being applied indirectly by conduction through the drum wall.

The burners are mounted in separate fireboxes aligned in tandem with the drum axis and are located far enough from the drum so that the flame does not impinge upon the drum. The drum is heated by radiation from the burner flames as well as from convection of air heated by the burner flames. Rotation of the drum prevents the burners from locally overheating the drum. In the present process the temperature is maintained to create a char by at least partially oxidizing the organic solids and embrittle the solids. Temperatures in the range of 150 to 1000° F. may be used, depending, among other factors, on the nature of the starting material and the type of apparatus which is to use the fuel.

A stationary shroud, or heat jacket, encompasses the rotating drum and burners. Movement through the drum is regulated by drum rotation and inclination and feed rate. The drum is tilted slightly toward the exit end. The arrangements of internal flights and chains in the drum are important factors in the efficient flow of material through the drum.

The char, which may be characterized as a combustible organic material, exits the lower end of the drum through a double door arrangement which reduces the amount of dust exiting and prevents air from entering the drum. A dust shroud encloses the double door exit end of the drum.

The vapors inside the drum are drawn out by applying a slight vacuum to the feed end of the drum. The withdrawn vapors are then sent to a condensing unit and collected. An important feature of the unit for this operation is an air tight seal between the rotating drum and the stationary vent housing around the feed auger. This seal must allow for some axial movement of the drum due to expansion and contraction from heating as angular misalignment and out-of-roundness.

On each end of the drum are steel "tires" which bear on trunnion rollers mounted on the trailer and provide means for drum rotation. Thrust rollers are incorporated into the trunnion assembly on the feed end and bear on the edges of the tire to prevent the drum from moving axially. Drum overall length changes about 3.5 inches during the heat up and cool down cycles, resulting in very large loads being applied to the thrust rollers. The steel tires are mounted to the drum on thin spacer plates allowing air circulation between the tires and drum. This is necessary to prevent excessive head conduction to the trunnion rollers which would greatly reduce the life of the roller bearings.

The feed to this element of the system is derived from any wastes source such as municipal solid and/or liquid wastes (MSW), industrial solid and/or liquid wastes, sanitary sewage, tires, other industrial, refining, agricultural and animal waste, non-infectious medical wastes and/or petrochemical wastes or mixtures thereof MSW generally includes paper, textiles, leather, rubber, yard wastes, wood, wood wastes and bark, garbage, plastics and paints. Such materials make up the greater part of so-called solid municipal wastes.

Thus substantially all of the organic material in solid wastes, e.g., in solid municipal wastes, industrial waste and agricultural waste can be subjected to the process of this invention to form a fuel. Solid MSW wastes typically have a moisture content of about 18%, almost all of which is associated with the combustible organic fraction. The food wastes may contain oleaginous materials in the form of meat fat, oils, etc. The presence of such materials introduces no problems in the process of this invention. Industrial wastes may include such items as divergent as chlorinated hydrocarbons to solid resins. Although, all of these materials may be fed to the rotating drum, normally only solids are used and the liquids are added in the second step. The rotating drum is of especial value in the initial particulation of the solid materials and the removal of volatile materials from the solids. The volatiles may be entrained, such as hydrocarbons and water on dirt or may be constituent components such as the break down of polymers under the temperature and handling conditions in the rotary drum.

If the process begins with a mixed solid waste, e.g., a solid municipal waste, it will generally be expedient to begin with some form of primary size reduction such as shredding. The preliminary step may conveniently be done in such equipment as flail mills, hammer mills, shredders, shears, cage disintegrators, chippers, cutters, disk mills, grinders, hoggers, rasp mills and the like. Large metal items, such as washing machines and water heaters may be removed prior to the initial sizing, since they are not useful in the fuel product of the process. Similarly, metal removal may be carried out along the process by magnets.

The physical separation of the organic combustible fraction from the mixed waste may be accomplished by one or more of several different known techniques including separation procedures based upon differences in such physical characteristics as size, shape, specific gravity, brittleness, elasticity, color reflectance, magnetic susceptibility, electric conductivity, absorption of electromagnetic radiation and radioactivity techniques and apparatus for using these characteristics to sort out such nonorganic materials as glass, metals, dirt, and the like are known and described in the literature. It is, of course, within the scope of this invention to begin with solid organic waste material which requires no sorting or separating from other waste materials. In such cases, it may be desirable or necessary to perform a size reducing step using appropriate equipment.

Thus, for example, hammermills, shredders or grinders can be employed to reduce such materials, as paper, wood, textiles or food wastes to the desired degree of comminution.

In the operation of the rotary drum, there is most likely to be a vaporous component removed, which is both aqueous and organic compounds, e.g., hydrocarbons. Since the present process is directed to the production of specific or consistent fuel product, the greater control that can be exercised over the constitution of the stream being processed, by being able to adjust the liquid level and the BTU level, the better the process. In the present process, it is contemplated in the preferred operation that all of the recovered liquids from the rotating drum will be reunited with the char from the drum, however, some feed compositions may prohibit that, thus the ability to remove and hold some portion of the liquid may make the feeds acceptable.

In the present process, the effluent from the rotating drum, i.e., the char and a portion of the recovered condensables are fed to a first attrition unit, for sizing the solids and otherwise dispersing and homogenizing the process liquor. A suitable apparatus for this step is a hydropulper as used in paper manufacturing. The solids in the process liquor are adjusted for the apparatus in which they are used, e.g., generally from about 20 mm to less than about 0.2 mm for the reconstituted product, comprising char and recovered vaporous liquids, to be useful as a fuel. The hydropulper reduces the solid particles to no larger than 15 mm. Thus, one or more reductions in an attrition mill will be necessary to reduce the particle size.

The reconstituted fuel product (char and aqueous liquids) of this invention is particularly suited for use in the production of synthesis gas (syngas) or cement kiln fuel.

Referring now to FIG. 1 the water, hydrocarbons and solids (char) are treated as shown. The recovered water conduit 6 and organic liquids conduit 8 are recombined with the char (the solids remaining after the heat treatment in the drum) conduit 16 and waste water as required to maintain the fluidity of the combined streams and fed via conduit 22 to hydropulper 20 where the size of solid particles are reduced to less than 15 mm.

The char effluent 12 from the drum is subjected to metal removal by hand or magnets and the metal remove via conduit 14.

The impeller 23, in addition to reducing the particle size of the char, throws large objects not reduced by the initial feed shredding to the trasher 28 for recycling. Impeller pump 26 passes the slurry from the hydropulper to attrition mill 30, where the solids are further reduced to less than 2 mm size. An recycle 36 returns a portion of the effluent from mill 30 to the hydropulper to maintain the fluidity of the stream and passes the remainder to a second attrition mill 40 via conduit 34 where the solids are reduced to a particle size of less than 0.2 mm.

The particle size leaving each attrition unit is determined by conventional screens used for such purposes in other applications. The effluent from mill 40 goes to storage in a tank 50 via conduit 38.

In a preferred embodiment the fuel is fed via conduit 42 to a partial oxidation unit 60, where it is partially oxidized to $H_2$ and CO. The flow for each component stream for this example are shown in the TABLE 1.

TABLE 1

| CONDUIT NO. | RATE |
|---|---|
| 2 | 10,000 LBS/HR |
| 4 | 1,000 LBS/HR |
| 6 | 2,900 LBS/HR |
| 8 | 1,000 LBS/HR |
| 14 | 1,700 LBS/HR |
| 16 | 3,400 LBS/HR |
| 18 | 900 LBS/HR |
| 22 | 8,200 LBS/HR |
| 24 | 50,000 LBS/HR |
| 32 | 600 GPM |
| 34 | 100 GPM |
| 36 | 500 GPM |
| 38 | 100 GPM |

Figure 2:
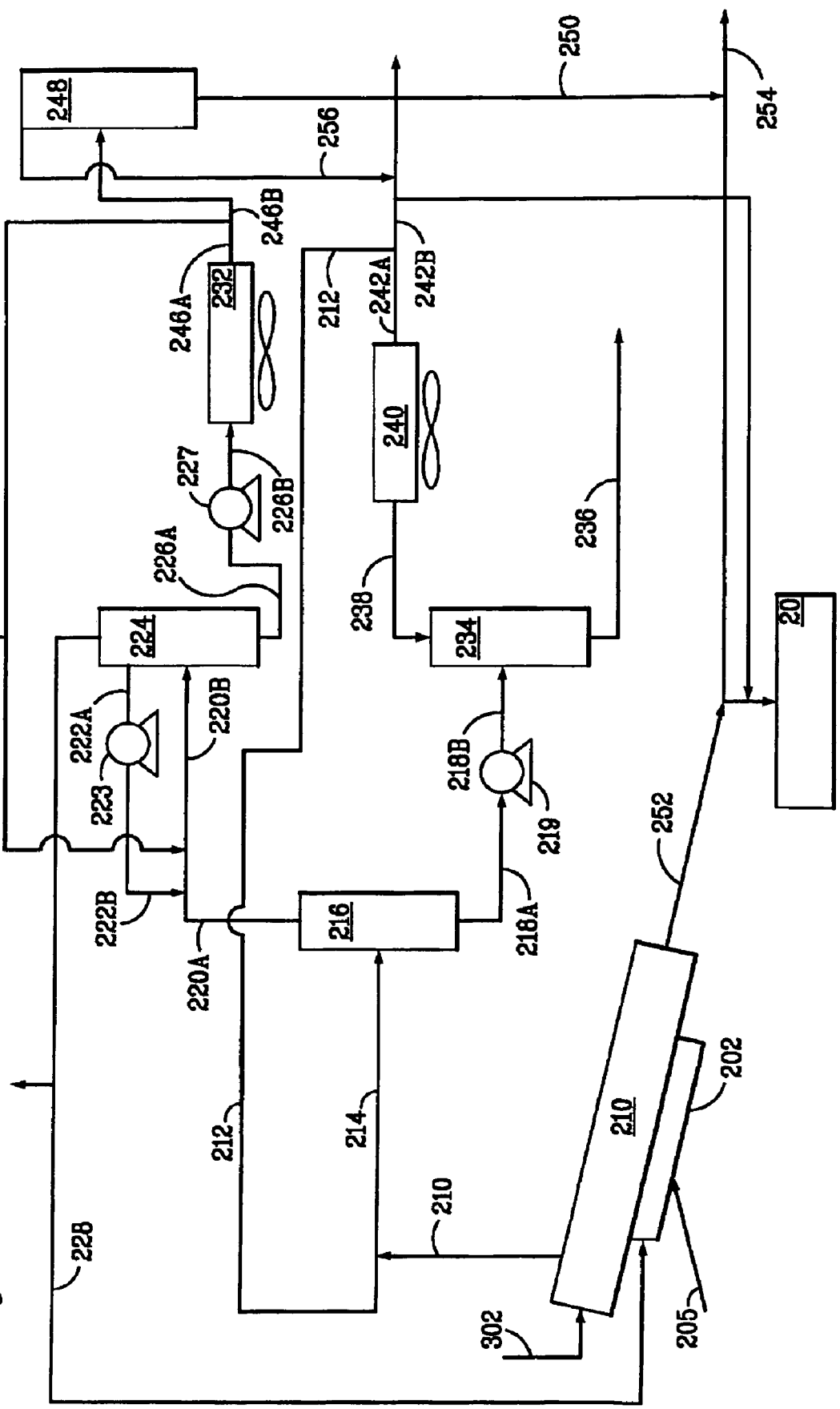
FIG. 2 is a schematic representation of one embodiment of the primary separator for the liquids and solids of the present invention.

Referring to the FIG. 2 the recovery of a volatile fraction is shown in more detail. Rotating drum 201 receives feed which is shredded, blended MSW or heterogeneous industrial waste via conduit 202, where it is heated to a temperatures up to 1000° F. The feed enters at the upper end and the traverses down its length (about 75 feet) at a slight angle as the drum rotates. The drum is heated by gas, e.g., natural gas via conduit 205. Line 210 carries drum vapors comprising hydrocarbons, water, and other volatile constituents from drum 201. Line 212 carries cool oil quench which is sprayed into transfer line 214 carrying the drum vapors to cool the drum vapors and condense the major portion of the hydrocarbons. The condensed vapors are collected in primary separator 216 where the liquid hydrocarbon is separated via line 218A from water vapor and light hydrocarbons, such as methane and non-condensables such as CO and $CO_2$ which exit the separator via line 220A.

The hydrocarbon (oil phase) recovered via line 218A is sent to filter 234 through pump 219 and line 218B. The filter may be, for example, an oil cyclone where dirty oil blowdown is collected via line 236 and recycled to the auger feed (not shown) to drum 201 or otherwise disposed of.

The clean oil recovered via line 238 is cooled by an air cooled heat exchanger 240 exiting through line 242A. A portion may be sent to storage or returned to the char, for example, in hydropulper 20 of FIG. 1 via line 242B and a portion sent through line 212 to quench the drum vapors in line 214.

Cool water is sprayed from line 222B into transfer line 220A to condense out most of the water and some higher hydrocarbons, which is collected by secondary separator 224 where the condensed water and some hydrocarbons are recovered via line 226A. The non-condensables, depending on the composition and the relevant environmental considerations, are recovered via line 228 and may be used as auxiliary fuel for the drum burners 202.

The condensed material (mainly water) leaves secondary separator 224 via line 226A and is pumped by pump 227 through line 226B to air cooled heat exchanger 232 hence into line 246A. A portion of the material in line 246A is returned via line 244 to transfer line 220A to aid in cooling the vaporous feed from the primary separator 216. Also in this embodiment cooled material from secondary separator 224 via line 222A, pump 223 and line 222B is used to cool the incoming vapors in line 220A.

A portion of cooled condensed material from heat exchanger 232 is also sent to oil/water phase separator 248 via 246A where water is recovered from the bottom of separator 248 via line 250 and may be recovered for disposal via line 254 or return to mix with the char 252 in the hydropulper 20.

The hydrocarbon phase from separator 248 is recovered to storage or hydropulper 20 via 256 and 242B. The operating temperatures and pressures for the various streams from FIG. 2 are shown in TABLE 2.

TABLE 2

| Stream No. | 214 | 220A | 218A | 242A | 242B | 212 | 220B | 222A |
|---|---|---|---|---|---|---|---|---|
| Temp., °F. | 249 | 249 | 249 | 249 | 125 | 125 | 148 | 148 |
| Press., PSIA | 14 | 14 | 14 | 90 | 75 | 75 | 13 | 13 |

| Stream No. | 226A | 226B | 246A | 222B | 244 | 246B | 256 | 254 | 242 | 250 |
|---|---|---|---|---|---|---|---|---|---|---|
| Temp., °F. | 148 | 148 | 115 | 203 | 115 | 115 | 115 | 115 | 123 | 115 |
| Press, PSIA | 13 | 90 | 75 | 17 | 75 | 75 | 75 | 75 | 75 | 75 |

While the invention has been disclosed in its preferred forms, it will be apparent to those skilled in the art that many modifications, additions, and deletions can be made therein without departing from the spirit and scope of the invention and its equivalents, as set forth in the following claims.

I claim:

1. A process for producing a liquid fuel composition, comprising:
   providing a feed of solid and liquid waste to a treatment zone under conditions of temperature to produce a solid char and vaporize liquids;
   condensing and recovering the vaporized liquids;
   combining the char and the recovered liquids to form a first slurry containing solids of a first size;
   combining the first slurry with additional wastes comprising combustible liquids;
   subjecting the first slurry and the additional wastes to conditions of attrition in a first attrition zone to produce a second slurry containing solids of a second size, the second size being smaller than the first size; and
   recovering the second slurry and subjecting the second slurry to attrition in at least one additional attrition zone under conditions of attrition.

2. The process according to claim 1, further comprising:
   subjecting the second slurry to attrition in at least one additional attrition zone under attrition conditions to produce a fuel slurry containing solids of less than 0.2 mm size; and
   recovering the fuel slurry as a fuel product.

3. The process according to claim 1, wherein the waste is municipal waste, industrial waste or mixtures thereof.

4. The process according to claim 1, wherein the conditions of temperature are in the range of 150 to 1000° F.

5. A fuel product produced according to the process of claim 1.

6. The process according to claim 1, wherein the waste comprises solid and liquid municipal waste.

7. The process according to claim 1, wherein the waste comprises agricultural waste.

8. The process according to claim 1, wherein the waste comprises refinery waste.

9. The process according to claim 1, wherein the waste comprises non-infectious medical wastes.

10. The process according to claim 1, wherein the waste comprises petrochemical wastes.

11. A process comprising:
    providing a feed of solid and liquid municipal waste, industrial wastes or mixtures thereof to a treatment zone under conditions of temperature to produce a solid char and vaporize liquids;
    condensing and recovering the vaporized liquids;
    combining the char and a portion of the recovered liquids to form a feed slurry containing solids;
    combining the feed slurry with additional wastes comprising combustible liquids;
    subjecting the feed slurry and the additional wastes to conditions of attrition in at least one attrition zone to produce a fuel slurry containing solids of fuel size of less than 0.2 mm; and
    recovering the fuel slurry as a fuel product.

12. The process according to claim 11, further comprising separating a portion of the recovered liquids as a product.

13. A process for producing a fuel from a waste, comprising:
    providing a feed of waste containing solids and liquids to a treatment zone under conditions of temperature to produce a solid char and vaporize liquids;
    condensing and recovering the vaporized liquids;
    removing a portion of the recovered liquids as liquid fuel;
    combining the char and the remainder of the recovered liquids to form a feed slurry containing solids;
    combining the feed slurry with additional wastes comprising combustible liquids;
    subjecting the feed slurry and the additional wastes to conditions of attrition in at least one attrition zone to produce a product slurry containing solids of fuel size of less than 0.2 mm; and
    recovering the fuel slurry as fuel product.

14. The process according to claim 13, wherein the conditions of temperature are in the range of 150 to 1000° F.

15. The process according to claim 13, wherein the waste is at least one of municipal solid waste, municipal liquid wastes, industrial solid waste, industrial liquid wastes, sanitary sewage, tires, refinery waste, agricultural waste, animal waste, non-infectious medical wastes, petrochemical wastes or mixtures thereof.

16. The fuel product produced according to the process of claim 13.

17. A process comprising:
    forming char and a liquid from waste;
    combining the char and liquid to form a feed slurry including solids;
    combining the feed slurry with additional wastes including combustible liquids to form a fuel slurry; and
    recovering the fuel slurry as a fuel product.

18. The process according to claim 17, wherein the feed slurry and the additional wastes are subjected to conditions of attrition in at least one attrition zone to produce a fuel slurry containing solids of fuel size.

19. The process according to claims 1, 11 or 17, wherein the additional wastes are added at a rate and amount to obtain a fuel slurry of specific properties.

20. The process according to claim 19, wherein the specific properties comprise at least one of viscosity and BTU content.

* * * * *